US012789734B2

(12) United States Patent
Faruque et al.

(10) Patent No.: US 12,789,734 B2
(45) Date of Patent: Nov. 10, 2026

(54) EXTENDABLE SPRING-LOADED BUMPER ASSEMBLY

(71) Applicant: Ford Global Technologies, LLC, Dearborn, MI (US)

(72) Inventors: Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 18/587,241

(22) Filed: Feb. 26, 2024

(65) Prior Publication Data

US 2025/0269813 A1 Aug. 28, 2025

(51) Int. Cl.

*B60R 19/28* (2006.01)
*B60R 19/34* (2006.01)
*B60R 19/36* (2006.01)

(52) U.S. Cl.

CPC .............. *B60R 19/28* (2013.01); *B60R 19/34* (2013.01); *B60R 19/36* (2013.01)

(58) Field of Classification Search

CPC ......... B60R 19/24; B60R 19/26; B60R 19/28; B60R 19/34; B60R 19/36; B60R 19/023; B60R 2021/01252; B60R 21/017

USPC ......................... 293/124, 132, 135, 137, 133

See application file for complete search history.

(56) References Cited

U.S. PATENT DOCUMENTS 2,094,739 A 10/1937 Geiger
2,142,328 A 1/1939 Mutter
3,756,643 A 9/1973 Weed
5,029,919 A 7/1991 Bauer
6,050,624 A 4/2000 Kim
6,393,999 B1 5/2002 Schneider
6,871,889 B2 3/2005 Ericsson
6,976,718 B2 12/2005 Nakanishi
8,113,555 B2 2/2012 Faruque
8,246,091 B1 * 8/2012 Jayasuriya ................ F16F 7/12 180/274
8,544,905 B2 10/2013 Handing et al.
9,067,552 B1 6/2015 Cheng et al.
9,227,585 B1 1/2016 Barbat et al.
(Continued)

FOREIGN PATENT DOCUMENTS

CN 209479608 U 10/2019
CN 112455373 A 3/2021
(Continued)

OTHER PUBLICATIONS

Translation DE-102005021725-A1 (Year: 2006).*
Non-Final Office Action for U.S. Appl. No. 17/934,218, filed Sep. 22, 2022, as issued by the USPTO Jun. 4, 2024.

*Primary Examiner* — Amy R Weisberg
*Assistant Examiner* — Denise L. Esquivel
(74) *Attorney, Agent, or Firm* — Frank A. MacKenzie; Brooks Kushman P.C.

(57) ABSTRACT

A vehicle-bumper assembly for a vehicle includes a vehicle bumper and a rod. The rod has a first end fixable to the vehicle bumper and a second end spaced from the first end along an elongated axis of the rod. A collar is fixed to the rod between the first end of the rod and the second end of the rod. The collar includes a pyrotechnically-activated release releasable from the rod. A coil spring has an inner diameter sized to be received by the rod.

7 Claims, 6 Drawing Sheets

(56) References Cited

U.S. PATENT DOCUMENTS

| | | | |
|---|---|---|---|
| 10,875,480 | B2 | 12/2020 | Fichtinger et al. |
| 12,208,758 | B2 | 1/2025 | Farooq et al. |
| 2011/0042975 | A1 | 2/2011 | Faruque |
| 2012/0098280 | A1 | 4/2012 | Handing et al. |
| 2013/0238197 | A1 | 9/2013 | Faruque et al. |
| 2017/0259766 | A1 | 9/2017 | Farooq et al. |
| 2019/0275981 | A1 | 9/2019 | Farooq et al. |
| 2025/0269813 | A1 | 8/2025 | Faruque et al. |

FOREIGN PATENT DOCUMENTS

| | | | | |
|---|---|---|---|---|
| DE | 102005021725 | A1 * | 11/2006 | ............. B60R 19/40 |
| JP | 2004161109 | A | 6/2004 | |

* cited by examiner

EXTENDABLE SPRING-LOADED BUMPER ASSEMBLY

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during certain vehicle-pedestrian impacts.

Some vehicles, such as light duty trucks and sport utility vehicles (SUVs), for example, may have a bumper height that could lead to an uneven impact on the femur and/or tibia of the pedestrian by the vehicle bumper during certain vehicle-pedestrian impacts. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the bumper. As such, a design for the vehicle front-end is investigated for pedestrian leg impact energy management while addressing ground clearance requirements.

DETAILED DESCRIPTION

Figure 1:
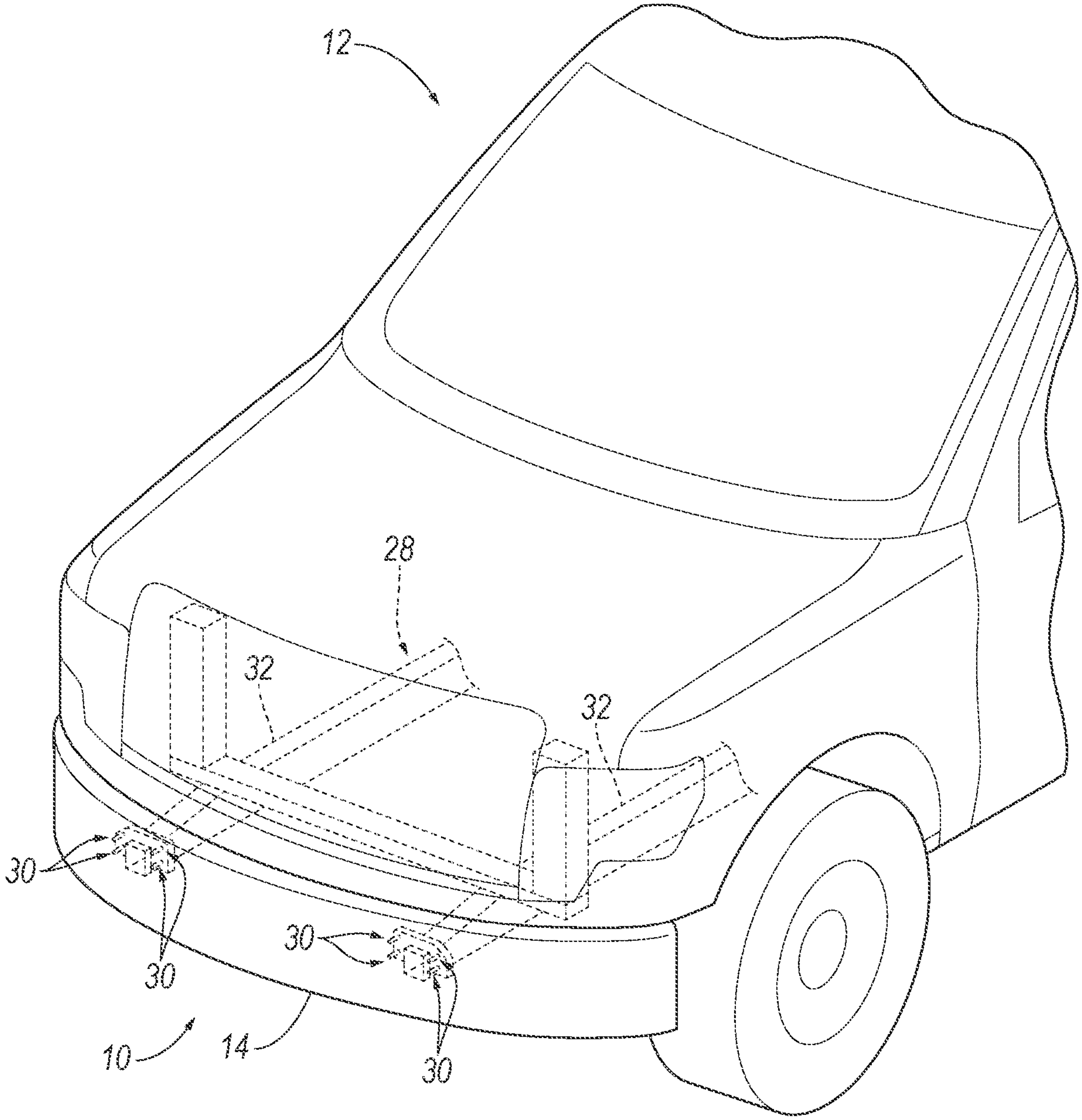
FIG. 1 is a perspective view of a vehicle including a bumper assembly with an energy-absorbing system in broken lines and with a retracted position of a bumper shown in broken lines.

A vehicle includes a vehicle frame and a vehicle bumper disposed vehicle-forward of the vehicle frame. A rod is elongated along an axis. The rod is fixed relative to the vehicle bumper and is slidably engaged with vehicle frame. A spring is compressed along the axis of the rod between the vehicle bumper and the vehicle frame. A collar is fixed relative to the rod and extends radially from the rod. The spring forces the collar toward the vehicle frame with the collar preventing vehicle-forward movement of the rod relative to the vehicle frame along the axis of the rod. The collar includes a pyrotechnically-activated release releasable from the rod.

The collar may abut the vehicle frame.

The vehicle frame may include a hole that slidably receives the rod.

The vehicle frame may include a flange between the collar and the spring. The flange may include a hole that slidably receives the rod. The collar may abut the flange. The vehicle may include a retainer fixed to the rod and spaced from the collar along the axis of the rod, the collar being between the retainer and the flange, and the retainer having an outer diameter larger than an outer diameter of the hole. The vehicle frame may include a crush can, the flange being fixed to the crush can. The vehicle may include a communication cable extending from the collar along the crush can.

The rod may support the vehicle bumper on the vehicle frame.

The spring may be on rod.

The rod may include a first length along the axis from the vehicle frame to the vehicle bumper, the coil spring having a free length longer than the first length of the rod and a fully-compressed length shorter than or equal to than the first length of the rod.

An assembly includes a vehicle bumper and a rod having a first end fixable to the vehicle bumper and a second end spaced from the first end along an elongated axis of the rod. A collar is fixed to the rod between the first end of the rod and the second end of the rod. The collar includes a pyrotechnically-activated release releasable from the rod. A coil spring has an inner diameter sized to be received by the rod.

The rod may be configured to extend through a hole in a vehicle frame with a first portion of the rod extending along the axis from the vehicle frame to the vehicle bumper. The rod may include a first length along the axis from the vehicle frame to the vehicle bumper. The coil spring may have a free length longer than the first portion of the rod and a fully-compressed length shorter than or equal to the first length of the rod.

The assembly may include a vehicle frame defining a hole. The rod may extend through the vehicle frame with a first portion of the rod extending from the vehicle frame to the first end of the rod. The coil spring may have a free length longer than the first portion of the rod and a fully-compressed length shorter than or equal to the first portion of the rod.

The rod may include threads at the first end and the vehicle bumper may include a threaded hole designed to threadedly receive the threads of the rod.

The assembly may include a retainer protruding radially outwardly from rod at second end.

With reference to the Figures, wherein like numerals indicate like parts throughout the several views, a bumper assembly 10 for a vehicle 12 includes a bumper 14 and a rod 16. The rod 16 has a first end 18 fixable to the bumper 14 and a second end 20 spaced from the first end 18 along an elongated axis A of the rod 16. A collar 22 is fixed to the rod 16 between the first end 18 of the rod 16 and the second end 20 of the rod 16. The collar 22 includes a pyrotechnically-activated release 24 releasable from the rod 16. A spring 26 has an inner diameter sized to be received by the rod 16.

The vehicle 12 includes a vehicle frame 28 and the bumper 14 is vehicle-forward of the vehicle frame 28 when the bumper 14 is assembled to the vehicle frame 28. In examples in which the bumper assembly 10 is assembled to the vehicle frame 28, the rod 16 is fixed relative to the bumper 14 and is slidably engaged with vehicle frame 28. The spring 26 is compressed along the axis A of the rod 16 between the bumper 14 and the vehicle frame 28. The collar 22 is fixed relative to the rod 16 and extends radially from the rod 16. The spring 26 forces the collar 22 toward the vehicle frame 28 with the collar 22 preventing vehicle-forward movement of the rod 16 relative to the vehicle frame 28 along the axis A of the rod 16.

Figure 4A:
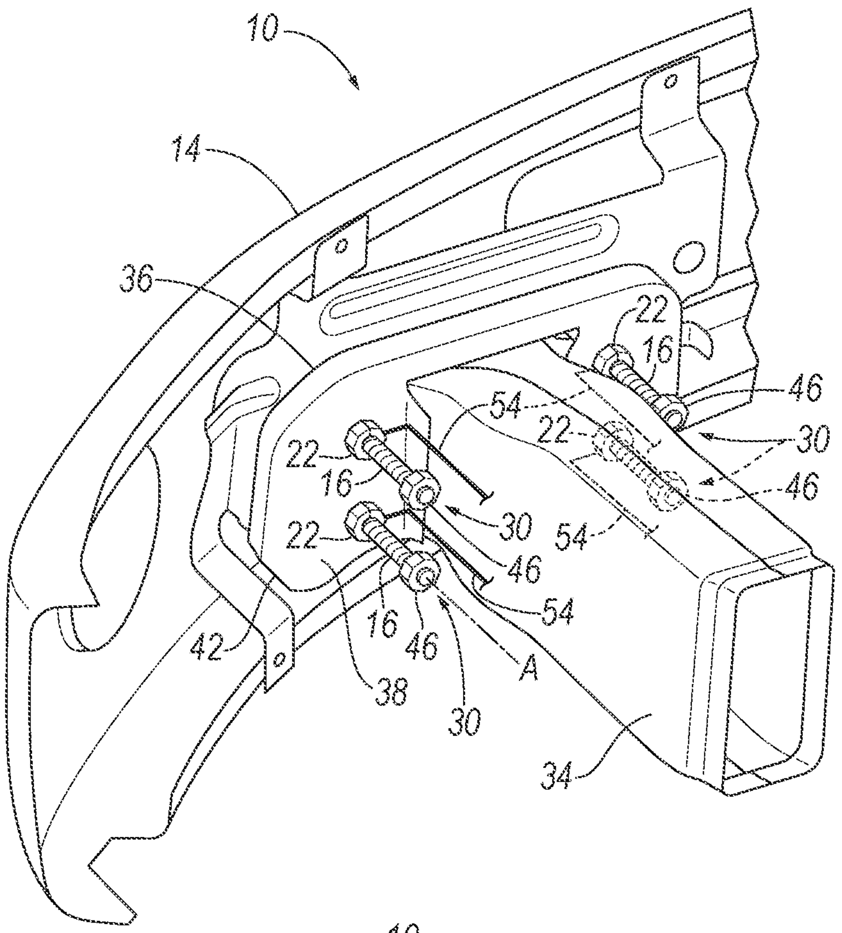
FIG. 4A is a rear view of a portion of the bumper assembly and a portion of the vehicle frame with the energy-absorbing system in an undeployed position.
Figure 4B:
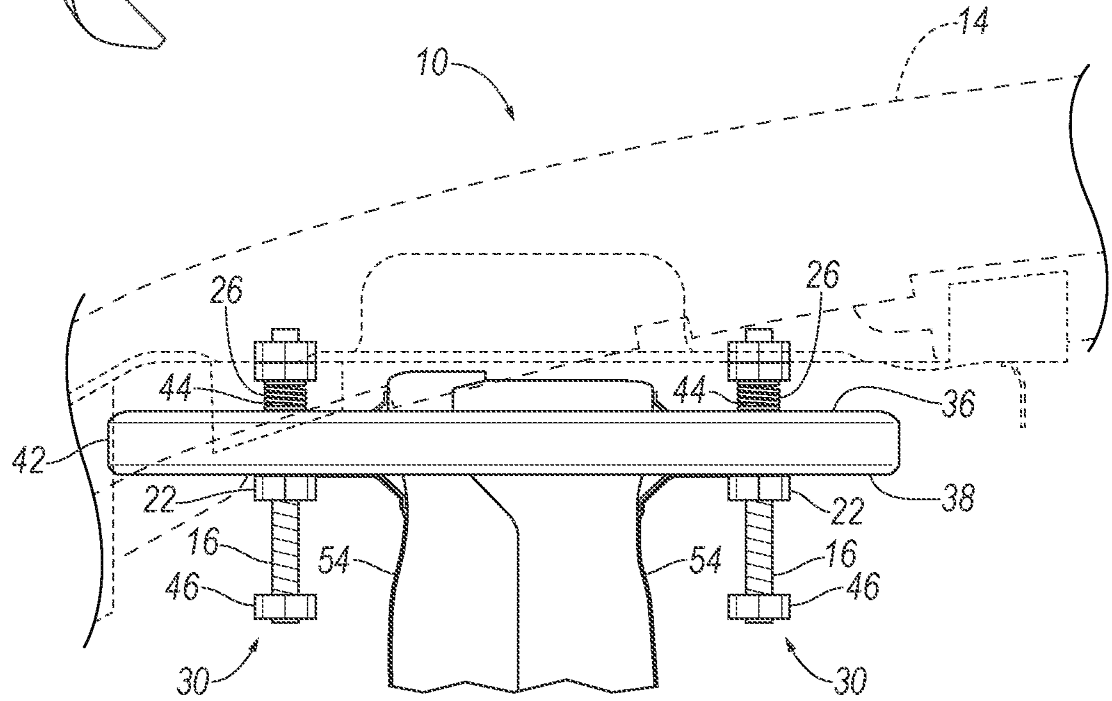
FIG. 4B is a top view of FIG. 4A.
Figure 5A:
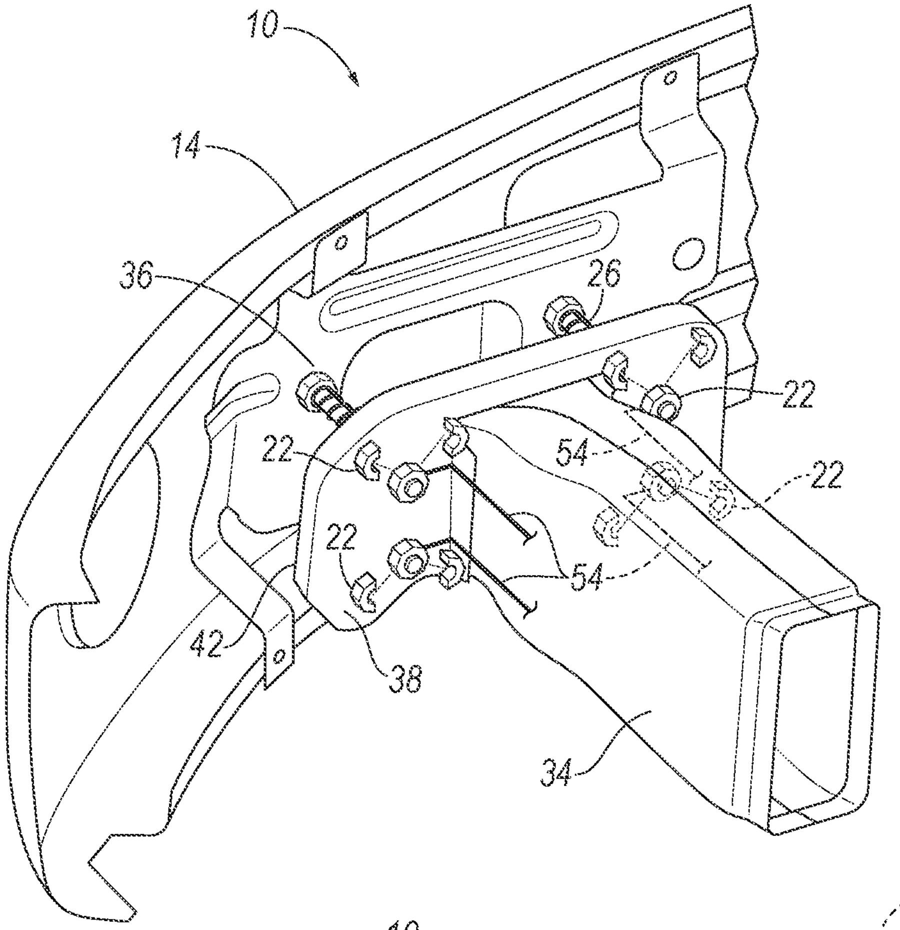
FIG. 5A is a rear view of a portion of the bumper assembly and a portion of the vehicle frame with the energy-absorbing system in a deployed position.
Figure 5B:
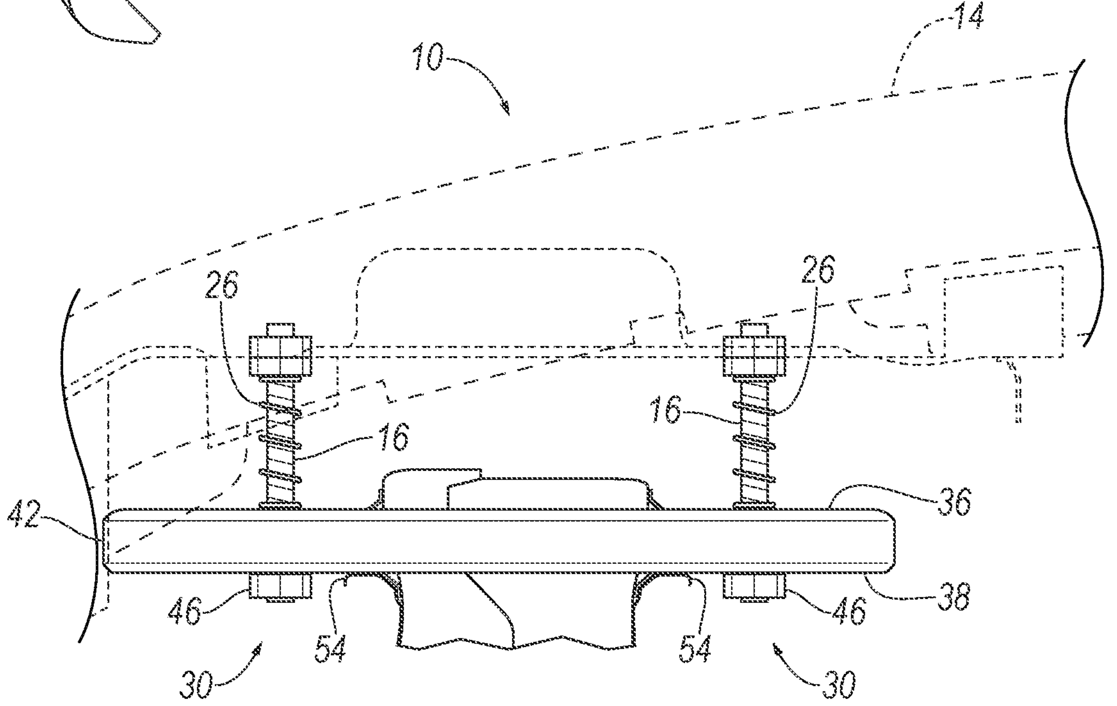
FIG. 5B is a top view of FIG. 5A.
Figure 6:
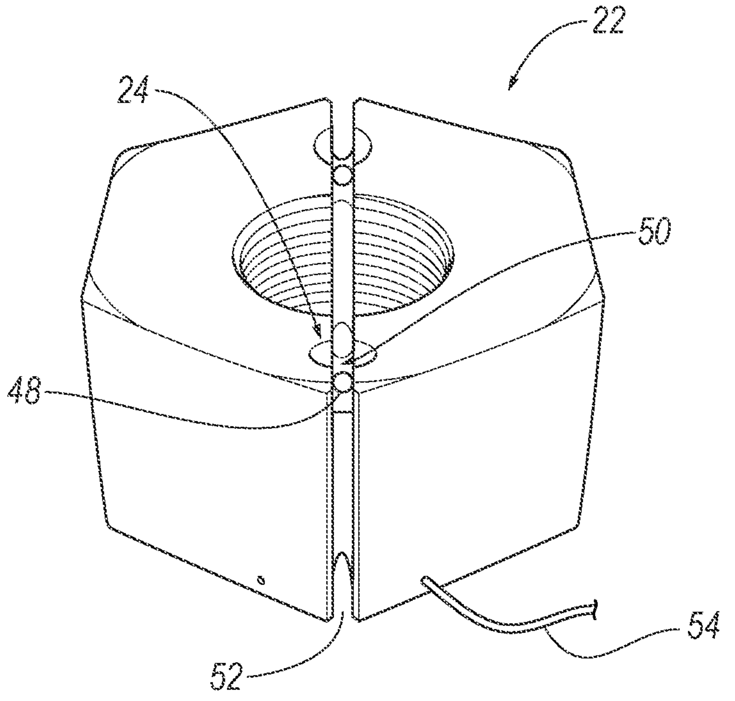
FIG. 6 is a perspective view of a collar of the bumper assembly.

When the collar 22 is engaged with the rod 16, the collar 22 prevents vehicle-forward movement of the rod 16 relative to the vehicle frame 28. When the collar 22 is disengaged with the rod 16 by activation of the pyrotechnically-activated release 24, as described below, the rod 16 is free to move relative to the vehicle frame 28 along the axis A of the rod 16. Specifically, in the event of certain vehicle impacts in which the bumper 14 impacts an object, e.g., a crash test leg form as described further below, the pyrotechnically-activated release 24 is activated to release the collar 22 from the rod 16, which allows the spring 26 to decompress in response to impact with the bumper 14. In the example shown in the figures, the spring 26 is in compression between the bumper 14 and the frame in a design position (FIGS. 4A-4B) and decompresses after release of the collar 22 from the rod 16. As the spring 26 decompresses, the rod 16 and the bumper 14 stroke vehicle forward relative to the vehicle frame 28 from the design position to an extended position (FIGS. 5A-5B). In such an example, the design of the bumper assembly 10 alleviates packaging constraints by allowing the bumper 14 to be in the design position during operation of the vehicle 12 and to move vehicle forward to the extended position in response to a detected vehicle impact. When the collar 22 is disengaged from the rod 16, force against the bumper 14, e.g., during certain vehicle impacts, of sufficient magnitude to compress the spring 26 will move the bumper 14 and the rod 16 vehicle rearward relative to the vehicle frame 28. For example, during certain impacts with a leg form, the bumper 14 and rod 16 move vehicle rearward against the force of the spring 26 to absorb energy from the impact and reduce energy delivered from the bumper 14 to the leg form. The spring 26 may provide for gradual absorption of the impact energy during certain vehicle impacts.

As described further below, the bumper assembly 10 includes an energy-absorber assembly 30 between the vehicle frame 28 and the bumper 14. The energy-absorber assembly 30 includes the rod 16, the spring 26, and the collar 22. The energy-absorber assembly 30 supports the bumper 14 on the vehicle frame 28 and allows the bumper 14 to release from the design position to the extended position in response to detection of certain vehicle impacts. As set forth below, the bumper assembly 10 may include a plurality of energy-absorber assemblies 30 that, in combination with each other, support the bumper 14 on the vehicle frame 28.

The bumper 14, as an example, may impact the knee of a pedestrian impact test leg form during a standardized test. The leg form may be a flexible pedestrian leg impactor (Flex-PLI) leg form. Example regulations that can use the leg form include Global Technical Regulation (GTR), ECE R127 and Korean Motor Vehicle Safety Standards (KMVSS). Example new car assessment programs that can use the leg form include EuroNCAP, CNCAP, and ANCAP.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, as an example, may have a relatively high ride height. With reference to FIG. 1, the vehicle 12 defines a vehicle-longitudinal axis extending between a front end (not numbered) and a rear end (not numbered) of the vehicle 12. The vehicle 12 defines a vehicle-lateral axis extending cross-vehicle from one side to the other side of the vehicle 12. The vehicle 12 defines a vertical axis. The vehicle-longitudinal axis, the vehicle-lateral axis, and the vertical axis are perpendicular relative to each other.

With reference to FIG. 1, the vehicle 12 includes the vehicle frame 28 and a vehicle body (not numbered). The vehicle body and the vehicle frame 28 may have a body-on-frame construction (also referred to as a cab-on-frame construction) in which the vehicle body and vehicle frame 28 are separate components, i.e., are modular, and the vehicle body is supported on and affixed to the vehicle frame 28. In the example shown in the Figures, the vehicle 12 has a body-on-frame construction. As another example, the vehicle body and the vehicle frame 28 may be of a unibody construction in which the vehicle frame 28 is unitary with the vehicle body (including frame rails 32, pillars, roof rails, etc.). In other examples, the vehicle frame 28 and vehicle body may have any suitable construction. The vehicle frame 28 and vehicle body may be of any suitable material, for example, steel, aluminum, and/or fiber-reinforced plastic, etc.

The vehicle body includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body may define a passenger cabin to house occupants, if any, of the vehicle 12.

The vehicle frame 28 includes frame rails 32 and may include cross beams. The frame rails 32 are elongated along the vehicle-longitudinal axis. The frame rails 32 are spaced from each other cross-vehicle, i.e., along the vehicle-lateral axis. The cross beams of the vehicle frame 28 extend from one frame rail 32 to the other frame rail 32 transverse to the vehicle-longitudinal axis.

With continued reference to FIG. 1, the vehicle frame 28 includes two frame rails 32. The frame rails 32 may define the cross-vehicle boundaries of the vehicle frame 28. The frame rails 32 may be elongated along the vehicle-longitudinal axis A from a rear end of the vehicle 12 to a front end of the vehicle 12. For example, the frame rails 32 may extend along substantially the entire length of the vehicle 12. In other examples, the frame rails 32 may be segmented and extend under portions of the vehicle 12, e.g., at least extending from below a passenger compartment of the vehicle 12 to the front end of the vehicle 12. In some examples, each frame rail 32 may be unitary from the rear end of the vehicle 12 to the front end of the vehicle 12. In other examples, the frame rails 32 may include segments fixed to each other (e.g., by welding, threaded fastener, etc.) and in combination extending from a rear end of the vehicle 12 to the front end of the vehicle 12.

As set forth above, the vehicle frame 28 may have a body-on-frame construction in which the vehicle body is supported on and affixed to the vehicle frame 28. In such an example, the frame rails 32 may include cab mount brackets (not shown) on which the vehicle body is supported and affixed. The cab mount brackets are fixed to the frame rails 32, e.g., welded to the frame rails 32. The cab mount brackets may extend outboard from the frame rail 32. The cab mount bracket may be cantilevered from the frame rail 32. The cab mount brackets are configured to support the vehicle body in a body-on-frame configuration. For example, the cab mount bracket may include a post or a hole that receives a hole or a post, respectively, of the vehicle body to connect the vehicle body to the vehicle frame 28. Specifically, the vehicle body may be fixed to the cab mount bracket. During assembly of the vehicle 12, the vehicle body is set on the vehicle frame 28 with fastening features of the vehicle body aligned with the cab mount brackets for engagement with the cab mount brackets.

The vehicle frame 28 may include suspension and steering attachment points (not shown) that support suspension and steering components of the vehicle 12. As one example, the suspension and steering attachment points may be suspension towers. Suspension and steering components of the vehicle 12 are connected to the vehicle frame 28, at least in part, at the suspension towers. The suspension and steering components include suspension shocks, suspension struts, steering arms, steering knuckles, vehicle wheels, etc.

The frame rails 32 and crossbeams may be extruded, roll-formed, etc. The frame rails 32 and crossbeams of the vehicle frame 28 may be of any suitable material, e.g., suitable types of steel, aluminum, and/or fiber-reinforced plastic, etc. The frame rails 32 and crossbeams may be hollow. The frame rails 32 and crossbeams may be rectangular in cross-section (e.g., a hollow rectangular cuboid), round in cross section, e.g., a hollow, round such as a hollow cylinder), etc.

Figure 2:
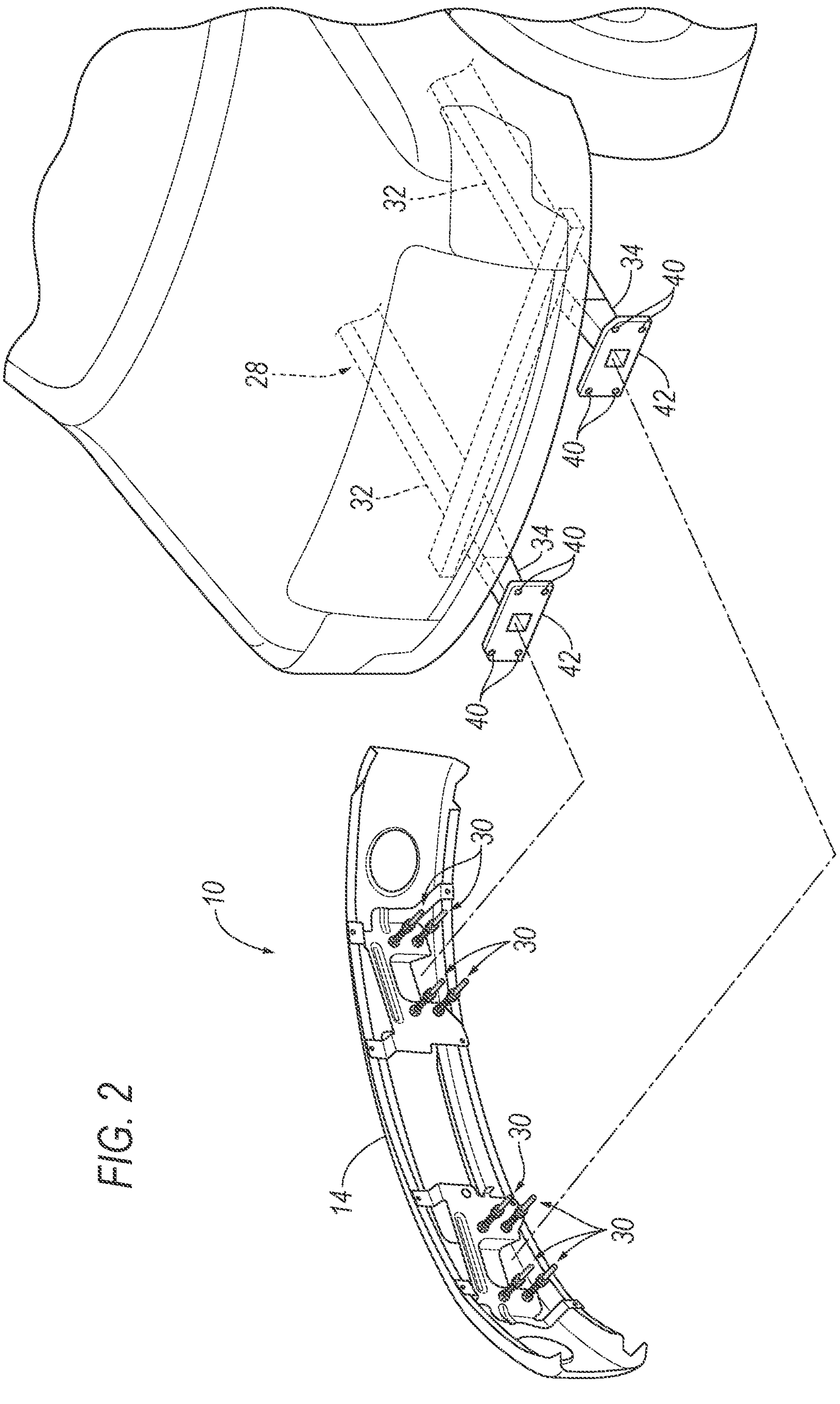
FIG. 2 the perspective view of FIG. 1 with the bumper assembly removed from a frame of the vehicle.
Figure 3:
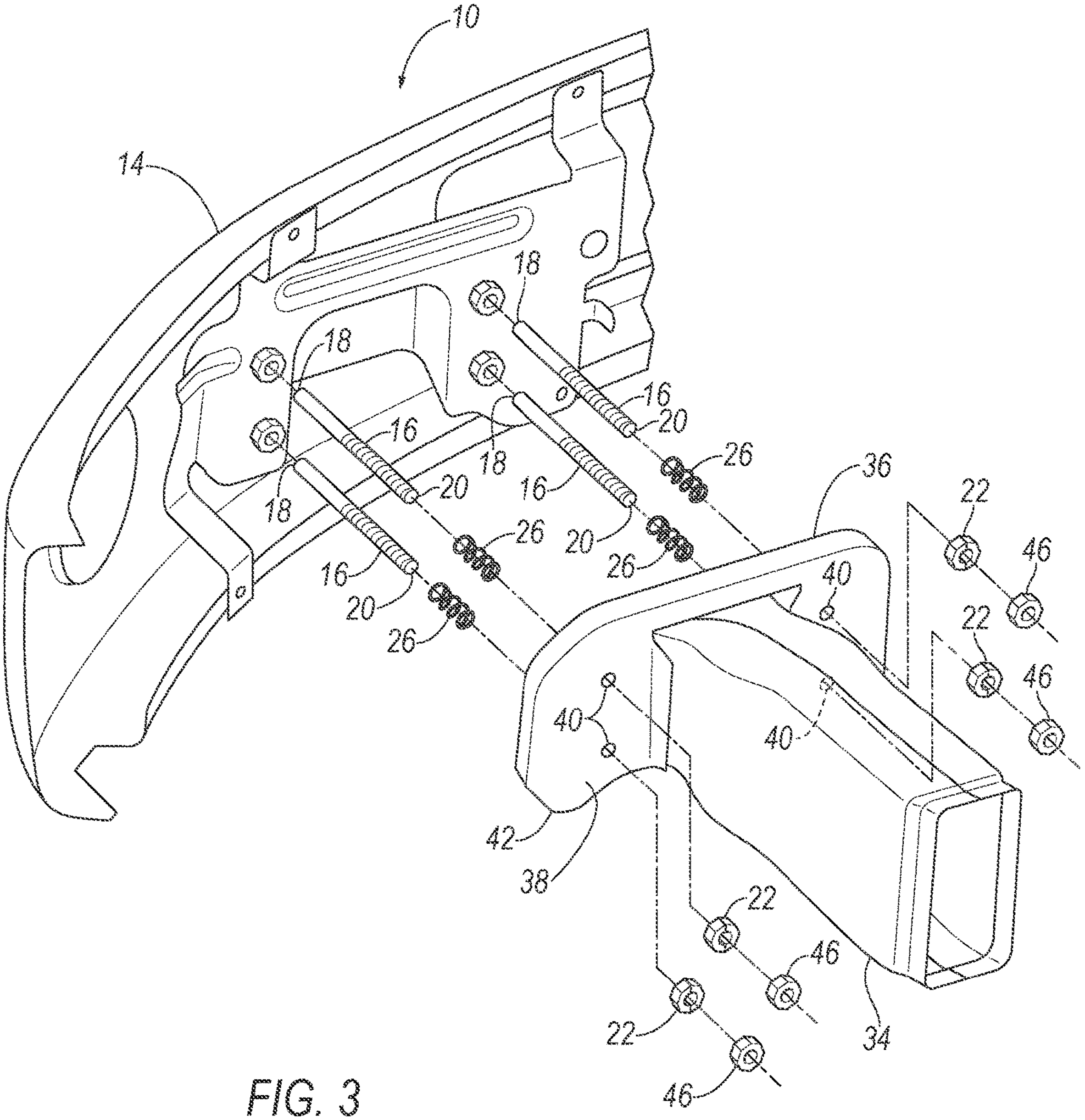
FIG. 3 is a rear view of a portion of the bumper assembly and a portion of the vehicle frame with the bumper assembly exploded from the vehicle frame.

With reference to FIGS. 1 and 2, the vehicle frame 28 includes frame-rail ends 34 extending vehicle-forward of the frame rails 32, respectively. In other words, the vehicle frame 28 includes two frame-rail ends 34 with one frame-rail end 34 extending vehicle-forward of one of the frame rails 32 and the other frame-rail end 34 extending vehicle-forward of the other frame rail 32.

In some examples, including the example shown in the Figures, the frame-rail ends 34 may be of the type referred to in industry as crush cans. In such examples, the frame-rail ends 34 may be designed to deform relative to the frame rail 32 during certain frontal-vehicle impacts. Specifically, the frame-rail ends 34 deform vehicle-rearward to allow rearward movement of the bumper assembly 10 relative to the frame rails 32 to absorb energy during certain vehicle impacts. The frame-rail ends 34 may include features that direct deformation of the frame-rail end 34 toward the frame rail 32 during frontal impact of the bumper 14. These features may include wall geometry, wall thickness, dimples, cutouts, etc.

The frame-rail end 34 is fixed to the respective frame rail 32. For example, the frame-rail end 34 may be fixed to the respective frame rail 32 by welding, fastening, etc. In the example shown in the Figures, the frame-rail end 34 is a component of the vehicle frame 28 that has a body-on-frame architecture, as described above. In other examples, the vehicle frame 28 may be of another architecture, e.g., a unibody architecture. In such examples, the frame rail 32 is a component of the vehicle frame 28 that has a unibody architecture and the frame-rail end 34 is connected to such frame rail 32.

The frame-rail end 34 is elongated along the vehicle-longitudinal axis. For example, the frame-rail end 34 may be coaxial with the frame rail 32 at the connection of the frame-rail end 34 and the frame rail 32. The frame rail 32 has a vehicle-forward end and the frame-rail end 34 extends vehicle-forward from the vehicle-forward end of the frame rail 32. Specifically, the frame-rail end 34 has a vehicle-rearward end at the frame rail 32 and a vehicle-forward end proximate the bumper 14. The frame-rail end 34 may be extruded, roll-formed, etc. The frame-rail end 34 may be of any suitable material, e.g., suitable types of steel, aluminum, and/or fiber-reinforced plastic, etc. The frame-rail end 34 may be hollow. The frame rails 32 and crossbeams may be rectangular in cross-section (e.g., a hollow rectangular cuboid), round in cross section, e.g., a hollow, round such as a hollow cylinder), etc.

With reference to FIG. 1, the vehicle 12 has a front-end structure. The front-end structure includes a grill and the bumper assembly 10. The grill is above the bumper assembly 10. The grill may be a component of the vehicle body and may be supported on other components of the vehicle body.

The bumper 14 extends transversely to the frame rails 32. With reference to FIG. 1, the bumper 14 is elongated along the vehicle-lateral axis. The bumper 14 may be of any suitable material such as metal (steel, aluminum, etc.), fiber-reinforced plastic, etc.

The bumper 14 has a vehicle-forward face 36 and a vehicle-rearward face 38. The vehicle-forward face 36 may be a class-A surface, i.e., a surface specifically manufactured to have a high-quality, finished aesthetic appearance free of blemishes. As an example, the vehicle-forward face 36 may be chromed. The mounting bracket of the bumper assembly 10 is on the vehicle-rearward face 38 of the bumper 14, as shown in the example in the Figures. The mounting bracket is fixed to and moves as a unit with the bumper 14.

In the example shown in the Figures, the bumper assembly 10 includes eight energy-absorber assemblies 30, specifically four energy-absorber assemblies 30 between each frame-rail end 34 and the bumper 14. In other examples, the bumper assembly 10 may include any suitable number of energy-absorber assemblies 30, i.e., one or more. Common numerals are used in the Figures to identify common features among the energy-absorber assemblies 30.

The energy-absorber assembly 30 of the bumper assembly 10 is between the vehicle frame 28 and the bumper 14 and is connected to the vehicle frame 28 and the bumper 14. In the example shown in the Figures, the rod 16 extends from the vehicle frame 28 to the bumper 14. As an example, the vehicle frame 28 includes a hole 40 that slidably receives the rod 16. In the example shown in the Figures, the vehicle frame 28 includes a flange 42 is fixed to the rest of the vehicle frame 28, e.g., the frame-rail end 34 in the example shown in the Figures, and the flange 42 includes the hole 40 that slidably receives the rod 16. In examples in which the frame-rail end 34 is a crush can, the flange 42 is fixed to the crush can. In such examples, the flange 42 is between the collar 22 and the spring 26. The spring 26 forces the bumper 14 vehicle forward relative to the vehicle frame 28, specifically the frame-rail end 34, and the collar 22 positions the bumper 14 in the design position against the force of the spring 26. In the example shown in the Figures, the collar 22 abuts the flange 42 vehicle rearward of the flange 42 in the design position. The flange 42 includes a vehicle-rearward face 38 and a vehicle-forward face 36, and the collar 22 abuts the vehicle-rearward face 38 while the spring 26 forces the rod 16 vehicle forward in the design position in the example shown in the Figures.

The bumper assembly 10 is supported by the vehicle frame 28, i.e., the weight of the bumper assembly 10 is borne by the vehicle frame 28. Specifically, the rod 16 supports the bumper 14 on the vehicle frame 28. In other words, the weight of the bumper 14 is borne by the rod 16 and the weight of the rod 16 and the bumper 14 is borne by the vehicle frame 28 through the connection of the rod 16 to the vehicle frame 28. The bumper assembly 10 may be a front bumper assembly 10, as shown in the example in the Figures. In other words, the bumper assembly 10 may be at a front of the vehicle 12 and, in such examples, the bumper 14 is operable for certain frontal collisions of the vehicle 12.

The bumper 14 and the rod 16 are movable along the axis A of the rod 16 between the design position and the extended position during certain vehicle impacts. The vehicle frame

28 movably receives the rod 16. For example, as shown in the example in the Figures, the rod 16 slides in the hole 40 axially along the axis A of the rod 16 and the bumper 14 moves between the design position and the extended position under the force of the coil spring between the bumper 14 and the vehicle frame 28. In such examples, the hole 40 is designed, i.e., sized, shaped, and oriented, to allow for movement of the rod 16 along the vehicle-longitudinal axis. In other examples, the vehicle frame 28, e.g., the frame-rail end 34, may include any suitable track, channel, etc., that slidably receives the rod 16 for movement of the rod 16 along the axis A.

The rod 16 is elongated along the axis A of the rod 16. In other words, the longest dimension of the rod 16 is along the axis A. The rod 16 may be, for example, cylindrical, as shown in the example in the Figures. The rod 16 may be, for example, metal or any other suitable material. The rod 16, or the rods 16 in examples including more than one rod 16, has sufficient rigidity to support the bumper 14 on the vehicle frame 28 and sufficient rigidity to transfer linear movement of the bumper 14 relative to the vehicle frame 28 during movement of the bumper 14 between the design position and the retracted position. In the example shown in the Figures, the rods 16, e.g., the eight rods 16, are designed to, in combination, support the bumper 14 on the vehicle frame 28.

The rod 16 is fixable relative to the bumper 14. When the bumper assembly 10 is assembled to the vehicle frame 28, the rod 16 is fixed to the bumper 14. The rod 16 may be fixed to the bumper 14 prior to assembly of the bumper assembly 10 to the vehicle frame 28. The rod 16 may be fixed to the bumper 14 by mechanical attachment that requires removal by a service technician with the use of a tool and/or destruction such as cutting, e.g., cutting material and/or welded joints, etc. In the example shown in the Figures, the rod 16 is threadedly engaged with a weld nut on the bumper 14. The rod 16 may be fixed to the bumper 14, e.g., the weld nut, with additional features such as welding, pinning, a counter-nut, etc.

The rod 16 is slidably engaged with the vehicle frame 28. In the example shown in the Figures, the hole 40 and the rod 16 are sized and shaped so that the rod 16 is free to slide vehicle forward and vehicle rearward along the axis A when forces act axially on the rod 16. The rod 16 is moveable axially relative to the vehicle frame 28 when the collar 22 is disengaged with the rod 16 and the spring 26 forces the bumper 14 and the rod 16 vehicle forward. The rod 16 is slidable axially through the hole 40 when force applied to the bumper 14 compresses the spring 26 when the collar 22 is disengaged from the rod 16.

As set forth above, the rod 16 has a first end 18 and a second end 20 spaced from the first end 18 along the axis A of the rod 16. The first end 18 is fixable to the bumper 14. In the example shown in the Figures, the rod 16 includes threads at the first end 18 and the bumper 14 includes a threaded hole 40, e.g., in a weld nut, designed to threadedly receive the threads of the rod 16.

When the bumper assembly 10 is assembled to the vehicle frame 28 in the design position, a first portion 44 of the rod 16 extends from the vehicle frame 28, e.g., the flange 42, to the bumper 14, e.g., the weld nut. For example, the first portion 44 of the rod 16 terminates at the vehicle frame 28 and at the bumper 14 when the bumper assembly 10 is in the design position. The second end 20 of the rod 16 is retained to the vehicle frame 28 by the collar 22 in the design position and by a retainer 46 in the extended position.

The collar 22 limits axial movement of the rod 16 when the collar 22 is engaged with the rod 16. The spring 26 forces the rod 16 vehicle forward along the axis A and the collar 22 interferes with the vehicle frame 28 to limit vehicle-forward movement of the rod 16. In the example shown in the Figures, the collar 22 abuts the vehicle-rearward face 38 of the flange 42 to act against the force of the spring 26.

The collar 22 is fixed relative to the rod 16 when the bumper assembly 10 is in the design position. In the example shown in the Figures, the collar 22 is connected directly to the rod 16 between the first end 18 of the rod 16 and the second end 20 of the rod 16. The collar 22 is fixed to the rod 16 in that the collar 22 is immovable axially along the rod 16 absent intentional release of the collar 22, e.g., destruction by activation of the pyrotechnically-activated release 24, or by removal by a service technician with the use of a tool and/or destruction such as cutting, e.g., cutting material and/or welded joints, etc., by the service technician. In the example shown in the Figures, the rod 16 has external threads and the collar 22 has internal threads threadedly engaged with the external threads of the rod 16 to axially fix the collar 22 relative to the rod 16. In such an example, additional engagement may be achieved by adhesive, bond, welding, etc., at the threads. In other examples, the collar 22 may be fixed to the rod 16 in any suitable fashion including one or a combination of threads, pinning, engagement of grooves, adhesive, bonding, welding, etc.

Since the collar 22 is fixed relative to the rod 16, the collar 22 maintains the rod 16 in position relative to the vehicle frame 28, e.g., the flange 42, when spring 26 forces the rod 16 vehicle forward in the design position. The strength of the rod 16, the collar 22, and the fixation therebetween, is sufficient to maintain the rod 16 in position against the force of the spring 26.

The collar 22 extends radially from the rod 16. In the example shown in the Figures, the collar 22 has the shape of a threaded nut. In such an example, the collar 22 extends endlessly around the circumference of the rod 16. In other examples, the collar 22 may extend along less than the entire circumference of the rod 16. The collar 22 is larger than the hole 40 such that the collar 22 abuts the vehicle frame 28, e.g., the flange 42, to maintain the rod 16 in the design position. The collar 22 has an outer dimension, i.e., taken radially outward from the rod 16, that is larger than the outer dimension of the hole 40 such that the collar 22 abuts the vehicle frame 28 in the design position to maintain the rod 16 and the bumper 14 in the design position against the force of the spring 26.

The collar 22 is releasable from the rod 16 and, when the collar 22 is released from the rod 16, the rod 16 and the bumper 14 move from the design position to the extended position. As set forth above, the collar 22 is fixed to the rod 16 absent intentional release and the collar 22 is releasable from the rod 16 and thus is releasably fixed to the rod 16.

The collar 22 may include a pyrotechnically-activated release 24 releasable from the rod 16. The pyrotechnically-activated release 24 includes a pyrotechnic charge 48 that releases the collar 22 from the rod 16 when activated. The activation of the pyrotechnically-activated release 24 releases the collar 22 from the rod 16 by destroying at least the connection between the collar 22 and the rod 16. The collar 22 may be a pyrotechnic fastener, and more specifically a pyrotechnic-separation nut. In some instances of such examples the pyrotechnic fastener, e.g., the pyrotechnic-separation nut, may be of a type known in the art. As one example, the pyrotechnically-activated release 24 includes a pocket 50 that receives the pyrotechnic charge 48 so that activation of the pyrotechnic charge 48 breaks the collar 22 to release the collar 22 from the rod 16. The pyrotechnically-activated release 24 may include a seam 52 in the collar 22 at or near the pyrotechnic charge 48. The seam 52 may be a weakened area at which separation is encouraged during activation of the pyrotechnic charge 48.

The pyrotechnic charge 48 may be combustible to produce a gas. The pyrotechnic charge 48 may be a solid mixture of substances that, when ignited, react to produce the gas. For example, the pyrotechnic charge 48 may be sodium azide (NaNO3), potassium nitrate (KNO3), and silicon dioxide (SiO2), which react to form nitrogen gas (N2).

The vehicle 12 may include a communication cable 54 connecting the pyrotechnically-activated release 24 to a vehicle computer 56, e.g., a body control module, that controls activation of the pyrotechnically-activated release 24. In the example shown in the Figures, the communication cable 54 extends along the frame-rail end 34, e.g., the crush can, along the flange 42 to the pyrotechnically-activated release 24. The vehicle computer 56 commands activation of the pyrotechnically-activated release 24 through the communication cable 54. The communication cable 54, for example, may include an electric wire through which an electrical impulse may be transmitted to the pyrotechnically-activated release 24 to activate the pyrotechnically-activated release 24.

The spring 26 is operatively engaged with the vehicle frame 28 and the bumper 14 to exert force the bumper 14 vehicle forward away from the vehicle frame 28 along the axis A. In the example shown in the Figures, the spring 26 abuts the bumper 14 and abuts the vehicle frame 28, specifically the flange 42. The spring 26 is compressed along the axis A of the rod 16 between the bumper 14 and the vehicle frame 28 in the design position. In such a position, the spring 26 forces the collar 22 toward the vehicle frame 28 with the collar 22 preventing vehicle-forward movement of the rod 16 relative to the vehicle frame 28 along the axis A of the rod 16. The spring 26 resiliently decompresses to move the bumper 14 from the design position to the extended position. In the extended position, the spring 26 may be compressed between the bumper 14 and the vehicle frame 28 during certain vehicle impacts. In such instances, the spring 26 is compressed as the bumper 14 moves from the extended position vehicle-rearward toward the vehicle frame 28. In the design position, the collar 22 may be released from the rod 16 to allow the bumper 14 to move vehicle forward to the extended position based on pre-impact detection of certain vehicle impacts, as described further below.

The spring 26, as an example, may be a coil spring. In the example shown in the Figures, the spring 26 is a coil spring on the rod 16 between the bumper 14 and the vehicle frame 28, i.e., the coils of the coil spring helically extend around the rod 16 along the axis A. In such an example, the spring 26 has an inner diameter sized to be received by the rod 16. The inner diameter of the spring 26 is larger than the outer diameter of the rod 16. The spring 26 may be metal.

The spring 26 has a free length longer than the first portion 44 of the rod 16 and a fully-compressed length shorter than or equal to than the first portion 44 of the rod 16. The spring 26 may be compressed to the fully-compressed length of the spring 26 in the design position.

In the example shown in the Figures, the bumper assembly 10, specifically the energy-absorber assembly 30, includes a retainer 46 fixed to the rod 16 to retain the rod 16 to the vehicle frame 28, e.g., in the hole 40, after the collar 22 is released from the rod 16 and the spring 26 moves the bumper 14 and rod 16 vehicle forward to the extended position. The collar 22 is between the retainer 46 and the flange 42. The retainer 46 may be spaced from the collar 22 along the axis A. The vehicle frame 28, e.g., the flange 42, is between the bumper 14 and the retainer 46.

The retainer 46 is sized to retain the rod 16 in the hole 40. The retainer 46 protrudes radially outwardly from rod 16, e.g., at second end 20. The retainer 46 has an outer dimension, i.e., taken radially outward from the rod 16, that is larger than the outer dimension of the hole 40 such that the retainer 46 abuts the vehicle frame 28 in the extended position to maintain the rod 16 and the bumper 14 engaged with the vehicle frame 28 in the extended position against the vehicle-forward force of the spring 26.

The retainer 46 is fixed to the rod 16 along the axis A of the rod 16, e.g., by threaded engagement, adhesive, welding, unitary formation, etc. The retainer 46 may be fixed to an end of the rod 16 distal to the flange 42.

In the example shown in the Figures, the rod 16 has external threads and the retainer 46 has internal threads threadedly engaged with the external threads of the rod 16 to axially fix the collar 22 relative to the rod 16. In such an example, additional engagement may be achieved by adhesive, bond, welding, etc., at the threads. In other examples, the retainer 46 may be fixed to the rod 16 in any suitable fashion including one or a combination of threads, pinning, engagement of grooves, adhesive, bonding, welding, etc. In the example shown in the Figures, the retainer 46 is a threaded nut that engages the same external threads in the rod 16 that the collar 22 engages.

Figure 7:
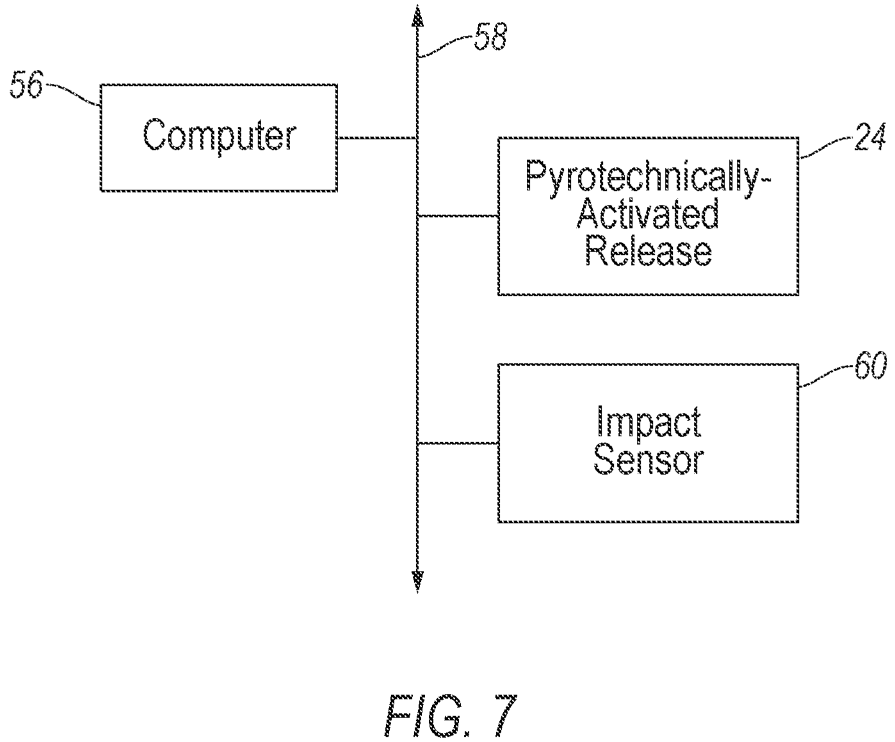
FIG. 7 is a schematic of a system of the vehicle.

With reference to FIG. 7, the vehicle 12 includes the vehicle computer 56 including a processor and a memory. The computer 56 may be a body control module. The memory includes one or more forms of computer readable media, and stores instructions executable by the computer 56 for performing various operations, including as disclosed herein and including, for example, the process described below. For example, the computer 56 may be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 56 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 56. The memory may be of any type, e.g., hard disk drives, solid state drives, servers, or any volatile or non-volatile media. The memory may store the collected data sent from the sensors. The memory may be a separate device from the computer 56, and the computer 56 may retrieve information stored by the memory via a vehicle communication network 58, e.g., over a CAN bus, a wireless network, etc. Alternatively or additionally, the memory may be part of the computer 56, e.g., as a memory of the computer 56.

As shown in FIG. 7, the computer 56 is generally arranged for communications on the vehicle communication network 58 that may include a bus in the vehicle 12 such as a controller area network CAN or the like, and/or other wired and/or wireless mechanisms. Alternatively or additionally, in cases where the computer 56 includes a plurality of devices, the vehicle communication network 58 may be used for communications between devices represented as the computer 56 in this disclosure. Further, as mentioned below, various controllers and/or sensors may provide data to the computer 56 via the vehicle communication network 58.

The vehicle 12 may include at least one impact sensor 60 for sensing certain vehicle impacts (e.g., impacts of a certain magnitude, direction, etc.), and the computer 56 in communication with the impact sensor 60 and the pyrotechnically-activated release 24. The computer 56 may activate the pyrotechnically-activated release 24, e.g., provide an impulse to the pyrotechnic charge 48 of the pyrotechnically-activated release 24 when the impact sensor 60 senses certain vehicle impacts. The impact sensor 60 may be configured to sense certain vehicle impacts prior to impact, i.e., pre-impact sensing. The impact sensor 60 may be in communication with the computer 56. The impact sensor 60 is configured to detect certain vehicle impacts. In other words, a "certain vehicle impact" is an impact of the type and/or magnitude for which inflation of the airbag is designed i.e., "certain" indicates the type and/or magnitude of the impact. The type and/or magnitude of such "certain vehicle impacts" may be pre-stored in the computer 56, e.g., a restraints control module and/or a body control module. The impact sensor 60 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 60 may be located at numerous points in or on the vehicle 12.

The computer 56 stores instructions to control components of the vehicle 12 according to the process described below. Use of "in response to," "based on," and "upon determining" herein, including with reference to FIG. 7, indicates a causal relationship, not merely a temporal relationship. The computer 56 stores instructions to, in response to detection of certain vehicle impacts (e.g., pre-impact detection of a certain imminent impacts), command activation of the pyrotechnically-activated release 24. Specifically, the computer 56 commands an electrical impulse to the pyrotechnic charge 48 to release the collar 22 from the rod 16, as described above. In examples including more than one pyrotechnically-activated release 24, the computer 56 may simultaneously command activation of each pyrotechnically-activated release 24. When the collars 22 release the rods 16, the springs 26 forces the bumper 14 and the rods 16 vehicle forward from the design position to the extended position. In examples in which the release of the collars 22 from the rods 16 is based on pre-impact detection, the certain vehicle impacts are detected before impact and the collars 22 are released from the rods 16 prior to impact. In such examples, during certain vehicle impacts of sufficient magnitude to compress the spring 26, the impact can move the bumper 14 and the rods 16 vehicle rearward relative to the vehicle frame 28. For example, during certain impacts with a leg form, the bumper 14 and rods 16 move vehicle rearward against the force of the springs 26 to absorb energy from the impact and reduce energy delivered from the bumper 14 to the leg form, as described above.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:

a vehicle frame;

a vehicle bumper disposed vehicle-forward of the vehicle frame;

a rod elongated along an axis, the rod being fixed relative to the vehicle bumper and slidably engaged with vehicle frame;

a spring compressed along the axis of the rod between the vehicle bumper and the vehicle frame;

a collar fixed relative to the rod and extending radially from the rod, the spring forcing the collar toward the vehicle frame with the collar preventing vehicle-forward movement of the rod relative to the vehicle frame along the axis of the rod, the collar including a pyrotechnically-activated release releasable from the rod;

the vehicle frame includes a flange between the collar and the spring;

the flange including a hole that slidably receives the rod; and a retainer fixed to the rod and spaced from the collar along the axis of the rod, the collar being between the retainer and the flange, and the retainer having an outer diameter larger than an outer diameter of the hole.

2. The vehicle of claim 1, wherein the collar abuts the flange.

3. The vehicle of claim 1, wherein the vehicle frame includes a crush can, the flange being fixed to the crush can.

4. The vehicle of claim 3, further comprising a communication cable extending from the collar along the crush can.

5. The vehicle of claim 1, wherein the rod supports the vehicle bumper on the vehicle frame.

6. The vehicle of claim 1, wherein the spring is on the rod.

7. The vehicle of claim 1, wherein the rod includes a first length along the axis from the vehicle frame to the vehicle bumper, the coil spring having a free length longer than the first length of the rod and a fully-compressed length shorter than or equal to the first length of the rod.

* * * * *